United States Patent
Isozu et al.

(10) Patent No.: US 7,127,496 B2
(45) Date of Patent: Oct. 24, 2006

(54) COMMUNICATIONS RELAY DEVICE, COMMUNICATIONS RELAY METHOD, COMMUNICATIONS TERMINAL APPARATUS AND PROGRAM STORAGE MEDIUM

(75) Inventors: Masaaki Isozu, Tokyo (JP); Kuniaki Kurihara, Tokyo (JP)

(73) Assignee: Sony Corporation, Tokyo (JP)

(*) Notice: Subject to any disclaimer, the term of this patent is extended or adjusted under 35 U.S.C. 154(b) by 658 days.

(21) Appl. No.: 10/006,266

(22) Filed: Dec. 4, 2001

(65) Prior Publication Data

US 2002/0091834 A1 Jul. 11, 2002

(30) Foreign Application Priority Data

Dec. 5, 2000 (JP) ............................ P2000-369793

(51) Int. Cl.
*G06F 15/16* (2006.01)
(52) U.S. Cl. ...................... 709/217; 709/227; 709/228
(58) Field of Classification Search ........ 709/217–219, 709/227–228
See application file for complete search history.

(56) References Cited

U.S. PATENT DOCUMENTS

| | | | | |
|---|---|---|---|---|
| 5,664,007 A | * | 9/1997 | Samadi et al. | 455/442 |
| 6,222,536 B1 | * | 4/2001 | Kihl et al. | 709/203 |
| 6,647,001 B1 | * | 11/2003 | Bhagavath et al. | 370/331 |
| 6,667,974 B1 | * | 12/2003 | Shigeta | 370/389 |
| 6,674,713 B1 | * | 1/2004 | Berg et al. | 370/217 |

* cited by examiner

*Primary Examiner*—William Vaughn
*Assistant Examiner*—Duyen Doan
(74) *Attorney, Agent, or Firm*—Sonnenschein Nath & Rosenthal LLP

(57) ABSTRACT

A system capable of switching terminals while continuously receiving data on terminals monitored by a relay device such as a gateway. In devices such as a gateway for relaying data, the session status of the terminal under control is monitored and the relay processing status of data received externally over a network is changed according to requests such as pause, list, resume and call from a terminal, and the dynamic data address is changed or the relay of data is temporarily halted (pause). The present structure allows the user (client) to change the terminal receiving the data and change the receive processing status so that data can be continuously received on the terminal used after switching terminals.

21 Claims, 13 Drawing Sheets

FIG.6

| SESSION ID | SESSION NAME | TIME | SOURCE ADDRESS | DESTINATION ADDRESS | PERMIT ADDRESS | MEDIA | SESSION STATUS |
|---|---|---|---|---|---|---|---|
| 00123 | VIDEO CONFERENCE | 20000701120 | 43.11.135.1 | 43.11.135.29 | 43.11.135.0/24 | VIDEO | PAUSE |
| 01543 | IP PHONE | 20000701133 | 43.11.135.17 | 43.11.135.29 | 43.11.135.30/24 | AUDIO | ACTIVE |
| .. | .. | .. | .. | .. | .. | .. | .. |

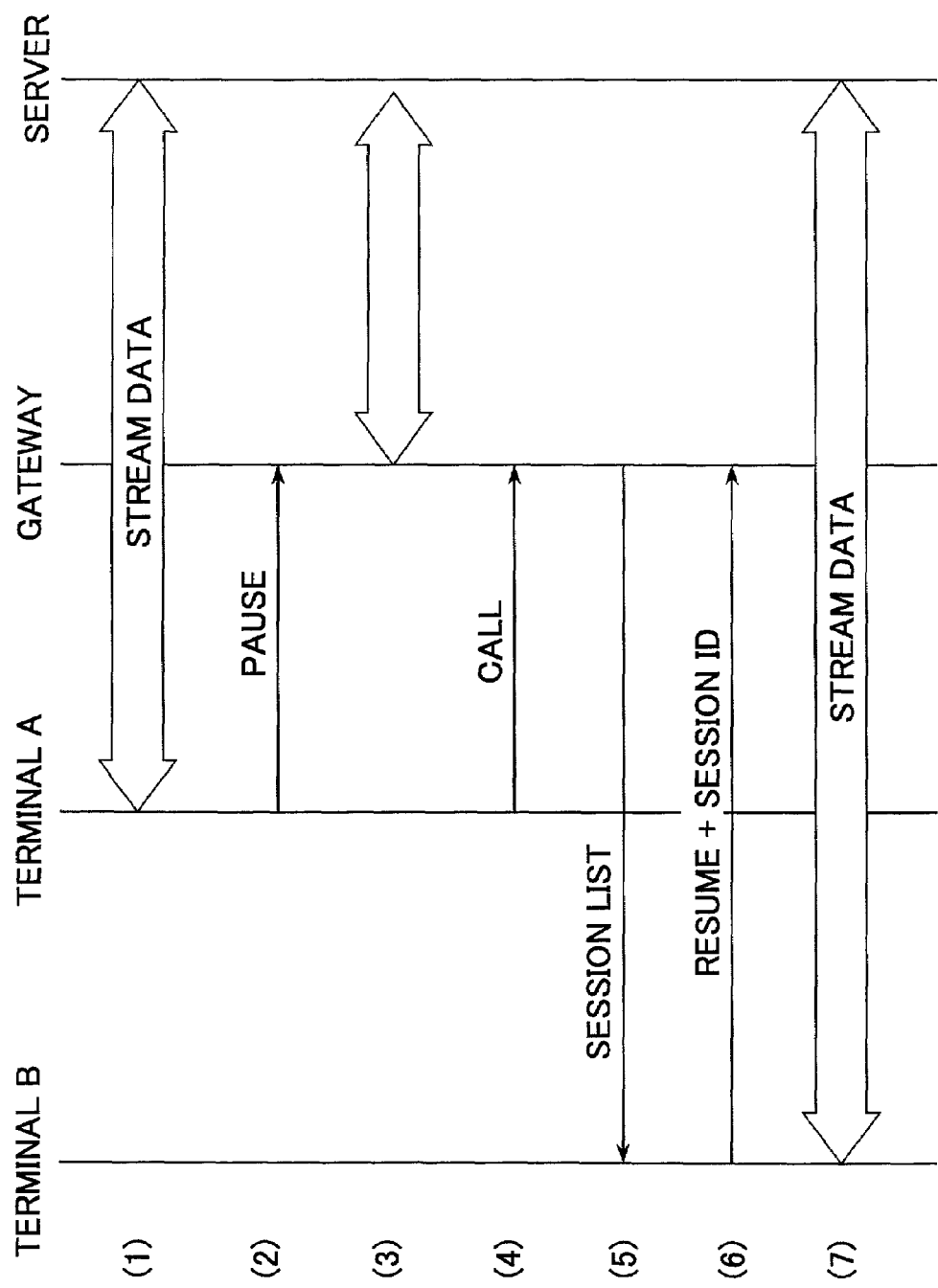

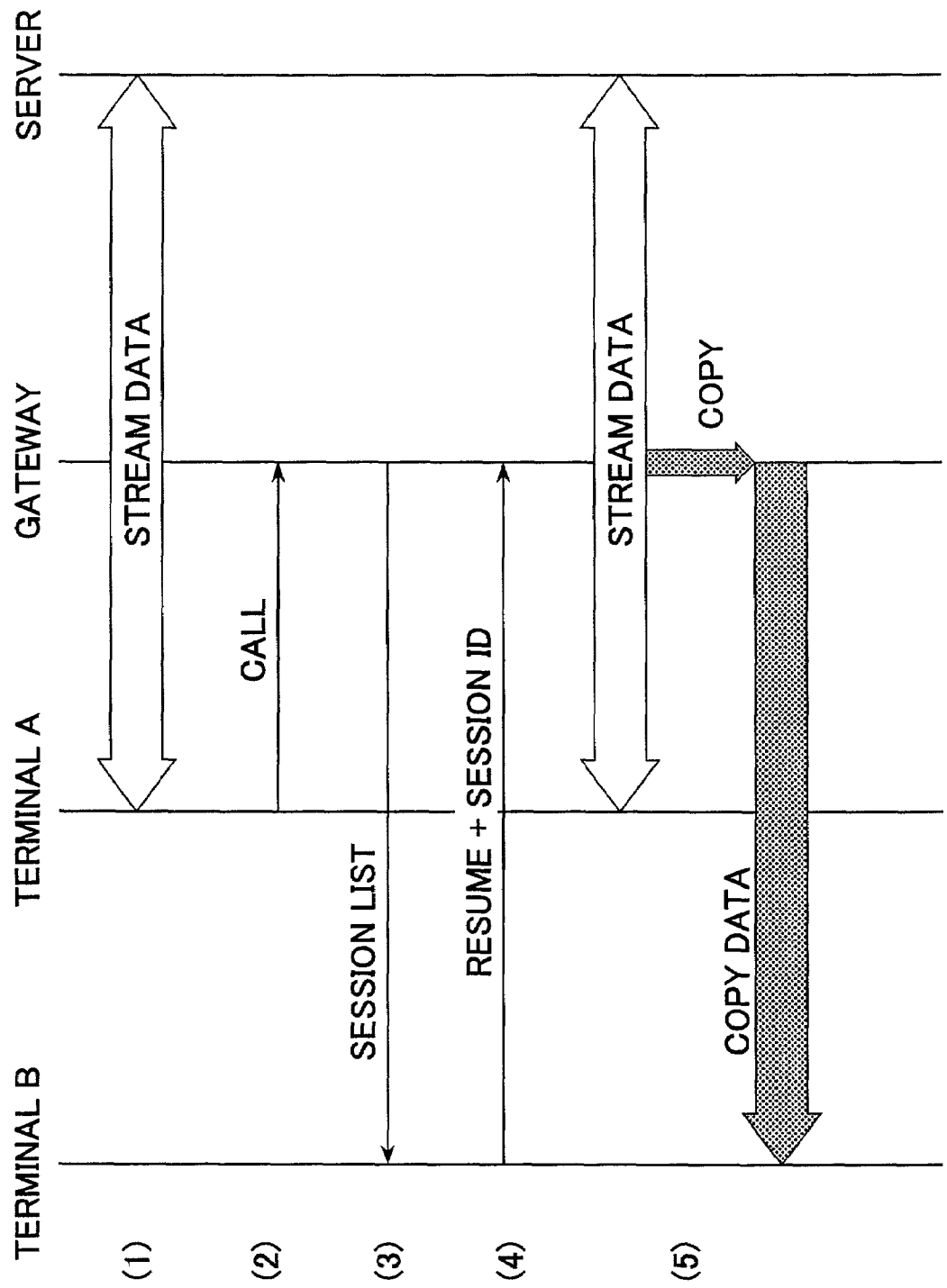

COMMUNICATIONS RELAY DEVICE, COMMUNICATIONS RELAY METHOD, COMMUNICATIONS TERMINAL APPARATUS AND PROGRAM STORAGE MEDIUM

RELATED APPLICATION DATA

The present application claims priority to Japanese Application(s) No(s). P2000-369793 filed Dec. 5, 2000, which application(s) is/are incorporated herein by reference to the extent permitted by law.

BACKGROUND OF THE INVENTION

1. Field of the Invention

The present invention relates to a communications relay device, communications relay method, communications terminal apparatus and program storage medium. The present invention relates in particular to a communications relay device, communications relay method, communications terminal apparatus and program storage medium capable of continuously transmitting and receiving data by the dynamic switching of terminals receiving data over a network.

2. Description of the Related Art

In recent years, along with the explosive growth of the Internet, the sending of moving image and voice data has also flourished. The transmission of moving image (video) and audio data over a network is performed as a common network application. On personal computer (PC) networks in particular, the downloading of a preferred compressed video from the World Wide Web (WWW), viewing of live images in real-time or the playing of music data has become quite popular.

Diverse types of communication terminals are currently available, and the possession by one user of a plurality of communication devices such as a desktop PC, notebook PC, cellular telephone or PDA (personal digital assistant) is a common situation. Amidst such circumstances, the user may desire to switch the moving image data or music data being received on a desktop PC, to a cellular terminal such as a PDA.

Switching the receive terminals during the ongoing receiving of data, requires processing to close the connection for the terminal (e.g. desktop PC) currently receiving data; and processing to again open (make) a connection on a different terminal (e.g. PDA).

In the switching process for making connections in the related art, there was absolutely no continuity between the connection before being switched and the connection after being switched and these were processed as independent connections so that a terminal for example, in the process of receiving image data or music data could not be switched to receive data from the point in time when it was switched. In other words, when receiving data after switching a terminal, if the data was video data then receiving was from the beginning of the video data, and if music data then receiving was from the beginning of the music. The data therefore all had to be received once again.

In this kind of processing, when for example receiving a service distributing video data or music data for a fee, the received data had to be processed as two independent connections due to this terminal switching, causing the problem of double billing.

In an environment where the user possesses a plurality of terminals, the various problems with switching data receive terminals at the desired timing, and the continuous receiving of data after switching a terminal, were factors causing the user to find the terminal less convenient and useful.

SUMMARY OF THE INVENTION

In view of the above described problems in the terminal switching process, the present invention has the object of providing a communications relay device, communications relay method, communications terminal apparatus and program storage medium capable of switching terminals at the timing desired by the user, and further capable of continuously receiving data on the terminal used after switching terminals.

In a first aspect of the present invention, a communications relay device functions as a relay means between an external network and a local network, in which the communications relay device comprises a session control means for controlling the session status of data communication sessions on the control terminal connected to the local network, and an address conversion means for converting the destination address of data relayed by the relay device, and session control means along with rewriting the session status according to a request from the control terminal, also outputs an address rewrite processing request to the address conversion means, and the address conversion means rewrites the address set in the session based on the address rewrite processing request from the session control means.

In the embodiment of the communications relay device of the present invention, the session control means temporarily stops (pauses) the relay of data relayed by the control terminal, based on a pause request from the control terminal.

In another embodiment of the communications relay device of the present invention, the session control means outputs a destination address for relay data corresponding to a session designated by the session identifier contained in the resume request, to the address conversion means as an address rewrite processing request set per the request transmit terminal, in response to a resume request as the request from the control terminal.

In yet another embodiment of the communications relay device of the present invention, the session control means, outputs a list showing the control sessions in the communications relay device, to the request transmit terminal, in response to a list request constituting the request from the control terminal.

In still another embodiment of the communications relay device of the present invention, the session control means outputs a list showing control sessions in the communications relay device, to a destination terminal contained in the call request, in response to a call request constituting the request from the control terminal.

In still another embodiment of the communications relay device of the present invention, the copy processing or cache processing of relay data in the communications relay device is executed in response to a request from the control terminal.

In still another embodiment of the communications relay device of the present invention, the communications relay device possesses a session control table that matches the session status with session identifier of the data session in the control terminal, and the session control means controls the session status based on the session control table, and rewrites the session status.

In still another embodiment of the communications relay device of the present invention, the session control table is comprised of a destination address and a source address made to correspond to the session identifier.

In a second aspect of the present invention, a communications relay method implements relay processing on the external network and local network, and the method comprises a session managing step for managing the data communication session status on the control terminal connected to the local network, an address conversion step to implement conversion processing on the destination address of relay data of the communications relay device.

In the session managing step, session status is rewritten according to a request from the control terminal, and an address rewrite request is output to the address conversion means.

In the address conversion step, rewrite of the address set in the session is performed based on an address rewrite request from the session control means.

In the embodiment of the communications relay method of the present invention, the session managing step possesses a step to temporarily stop the relay of data relayed by the control terminal based on a pause request from the control terminal.

Also in the embodiment of the communications relay method of the present invention, a session managing step comprises a step to output a destination address for relay data corresponding to a session designated by the session identifier contained in the resume request, to the address conversion means as an address rewrite processing request set in the request transmit terminal in response to a resume request as the request from the control terminal.

Further, in the embodiment of the communications relay method of the present invention, a session managing step comprises a step to output a list showing the control sessions in the communications relay device, to the request transmit terminal, in response to a list request as the request from the control terminal.

Still further in the embodiment of the communications relay method of the present invention, a session managing step comprises a step to output a list showing control sessions in the communications relay device, to a destination terminal contained in the call request, in response to a call request constituting the request from the control terminal.

Yet further in the embodiment of the communications relay method of the present invention, the method comprises a step to execute copy processing or cache processing of relay data in the communications relay device in response to a request from the control terminal.

In yet a third aspect of the present invention, a communications terminal device for receiving data by way of the communications relay device, outputs to the communications relay device, a resume request as the data transmit request accompanying the designated session identifier.

Further in the embodiment of the communications terminal device of the present invention, the terminal device outputs a pause request to the communications relay device to temporarily stop the on-going relay of data in the control terminal.

Still further in the embodiment of the communications terminal device of the present invention, the terminal device outputs to the communications relay device, a list request as the output processing request for a list showing the session processed in the communications relay device.

Yet further in the embodiment of the communications terminal device of the present invention, the terminal device outputs to the communications relay device, a call request for a destination terminal contained in a request showing the session processed in the communications relay device.

Further in the embodiment of the communications terminal device of the present invention, the terminal device outputs to the communications relay device, a copy processing request or a cache processing request for relay data in the communications relay device.

In yet a fourth aspect of the present invention, a program storage medium for providing a computer program to execute relay processing between an external network and a local network on a computer system, is characterized in that the computer program comprises: a session managing step for controlling the data communication session status on the control terminal connected to the local network; and an address conversion step to implement conversion processing on the destination address of relay data of the communications relay device, in which the session managing step rewrites the session status according to a request from the control terminal, and outputs an address rewrite request to the address conversion means, and the address conversion step rewrites the address set in the session based on an address rewrite request from the session control means.

The program storage medium of the fourth aspect of the present invention is for example, a medium providing a computer program loadable by computer for a general-purpose computer system for running program codes of various types.

The program storage medium as described above, is defined as the computer program and storage medium that mutually function to dynamically implement the specified computer program functions on the computer system. In other words, mutual dynamic functions are implemented on the computer system by installing the computer program in the computer system by way of the storage medium, and in this way render the same effects as the other aspects of the present invention.

In the communications relay device, communications relay method, communications terminal apparatus and program storage medium of the present invention as described above, the session status of controlled terminals on a data relay device such as a gateway, can be monitored, and requests such as pause, list, resume and call issued from the terminal to run processing such as on data received externally over a network such as changing the relay process status, the dynamic destination or pausing it. Changes in the data receive terminal and changes in the receive status can therefore be made by the user (client), and if the terminal receiving the data is changed, then data can still be continually received after the terminals are switched.

Other objects, characteristics and advantages of the present invention will become apparent from the following detailed description based on the embodiments and accompanying work drawings of the present invention.

BRIEF DESCRIPTION OF THE DRAWINGS

FIG. 6 is a drawing showing a typical session control table held in the data relay device of the present invention.

FIG. 12 is a chart showing a data receive terminal change process sequence (example 2) in the system of the present invention.

FIG. 13 is a chart showing a data receive terminal change process sequence (example 3) in the system of the present invention.

DESCRIPTION OF THE PREFERRED EMBODIMENTS

Figure 1:
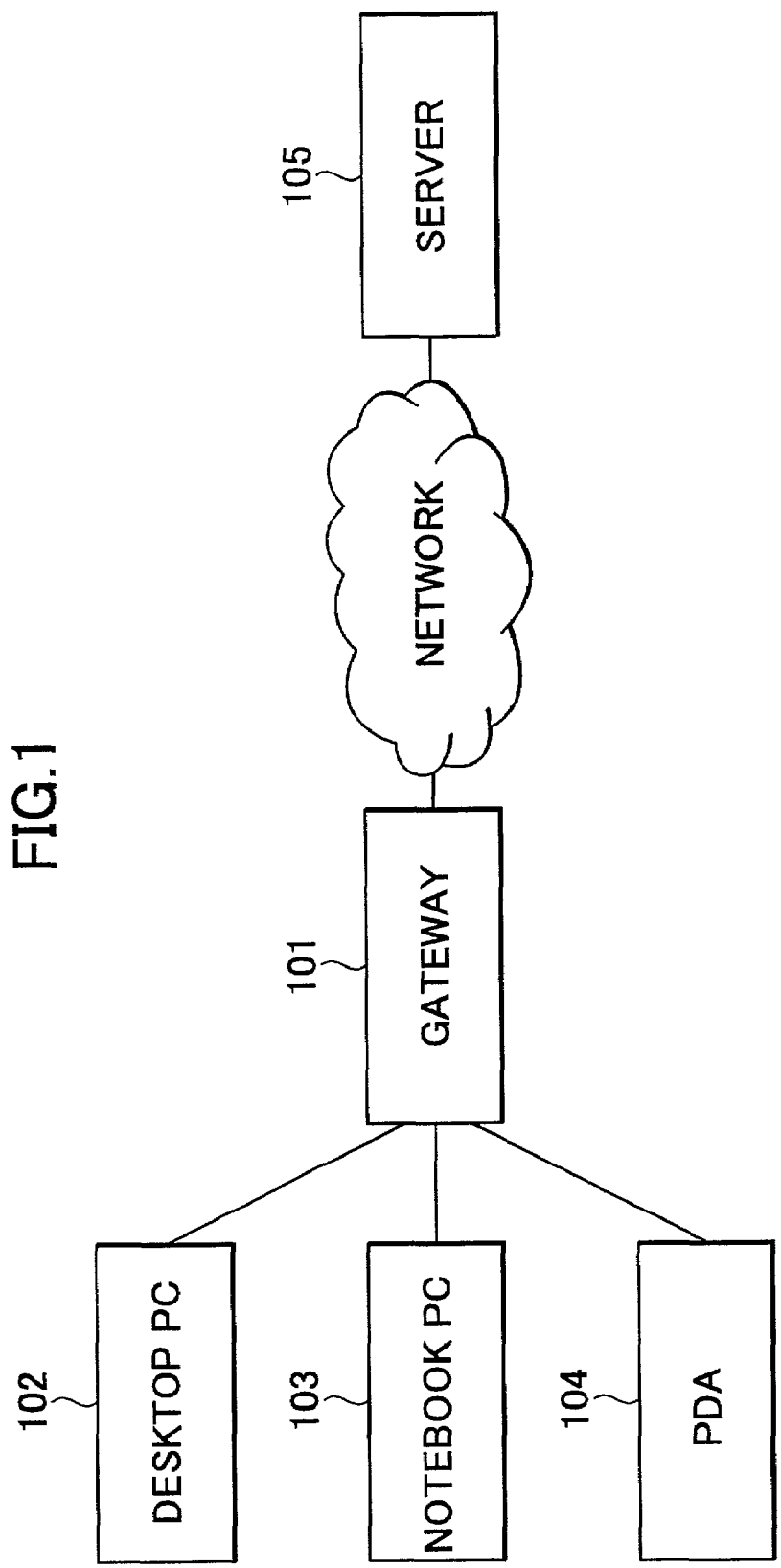
FIG. 1 is a block diagram illustrating the structure for receiving data over a gateway and network of the system applicable to the present invention.

FIG. 1 is a drawing showing the concept of the system comprised by the communications relay device and communications terminal device of the present invention. FIG. 1 is an example showing the Internet as the WAN (Wide Area Network) environment and for example, a SOHO (Small Office/Home Office) under a LAN environment connected by a gateway as the network connection device constituting the communication relay device.

As shown in FIG. 1, to receive stream data such as moving images and audio from the Internet on a terminal, the data packet is relayed by way of a home or company gateway or service provider gateway serving as the relay device.

In the structure shown in FIG. 1, a gateway 101 serves as the relay device for the communication terminals consisting of a desktop PC 102, a notebook PC 103 and a PDA 104, and relays stream data for distribution from a server 105.

The gateway 101 is assigned with one or a plurality of global IP addresses from the ISP (Internet Service Provider) and controls a plurality of IP terminals (desktop PC 102, notebook PC 103, PDA 104), as the host constituting the communication devices under its control. The gateway 101 here combines the functions of a DHCP (Dynamic Host Configuration Protocol) server to actively assign dynamic IP addresses to hosts with whom access is requested; and a DNS (Domain Name System) server for matching the domain name with the IP address. The IP terminal under control of the gateway 101 can connect with external terminals over the gateway 101 by means of the IP address assigned by the gateway 101 and is capable of various processing such as receiving image data or receiving audio.

Image data and audio data must be sent in real-time over the network and an uninterrupted supply of data is essential, so protocols such as TCP (Transmission Control Protocol) that resend data are not generally used. UDP (User Datagram Protocol) that does not use resend processing is utilized. TCP may however be used for sending and receiving.

UDP is designed so an application process can send data at a minimum overhead, to other application processes on remote machines. Information in the UDP header therefore consists only of the source port No., destination port No., data length and checksum and does not contain a data field for identifying packet sequences such as is held in TCP (Transmission Control Protocol), etc.

An RTP (Real-time Transport Protocol) is used as the send/receive protocol for real-time image and audio data in IP networks. RTP is positioned in the transport layer and is commonly utilized on UDP.

Figure 2:
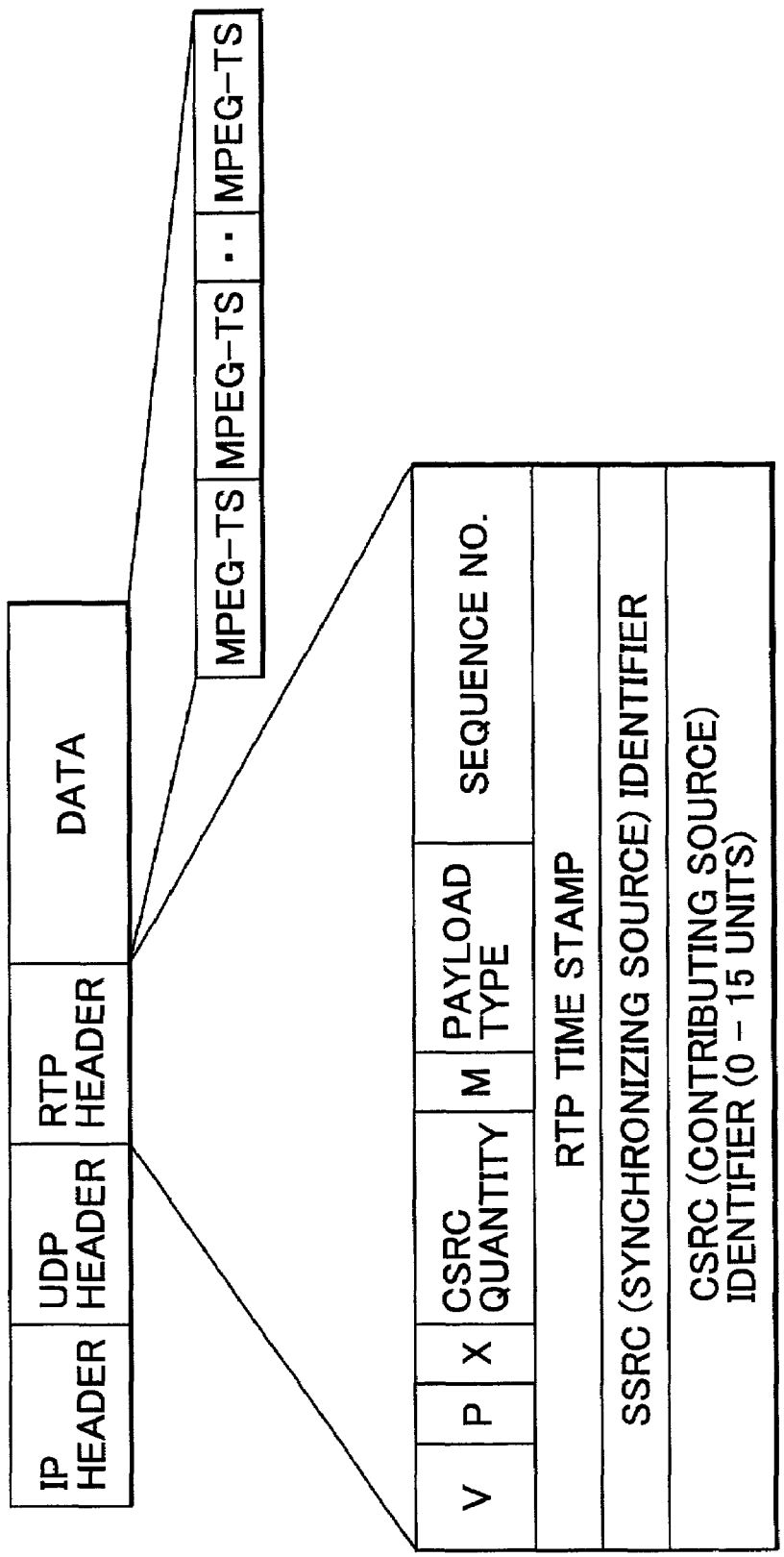
FIG. 2 is a block diagram showing the RTP header structure in the IP packet sent in the system of the present invention.

FIG. 2 shows in detail, the RTP header in the IP packet packetized by RTP, UDP, IP from an MPEG transport stream. Fields for a version No. (v), padding (P), presence/absence of extension header (X), source count (CRSC: Contributing Source), marker information (M), payload type, sequence No., RTP time stamp, synchronized source identifier (SSRC), and contributing source (CRSC) identifier are formed in the RTP header. When the RTP packet is opened, the processing time is controlled by means of the time stamp added to the header, and reproduction (playback) of real-time video or of audio can be controlled. As shown in FIG. 2, a plurality of MPEG transport streams of compressed data are stored in the IP packet.

Figure 3:
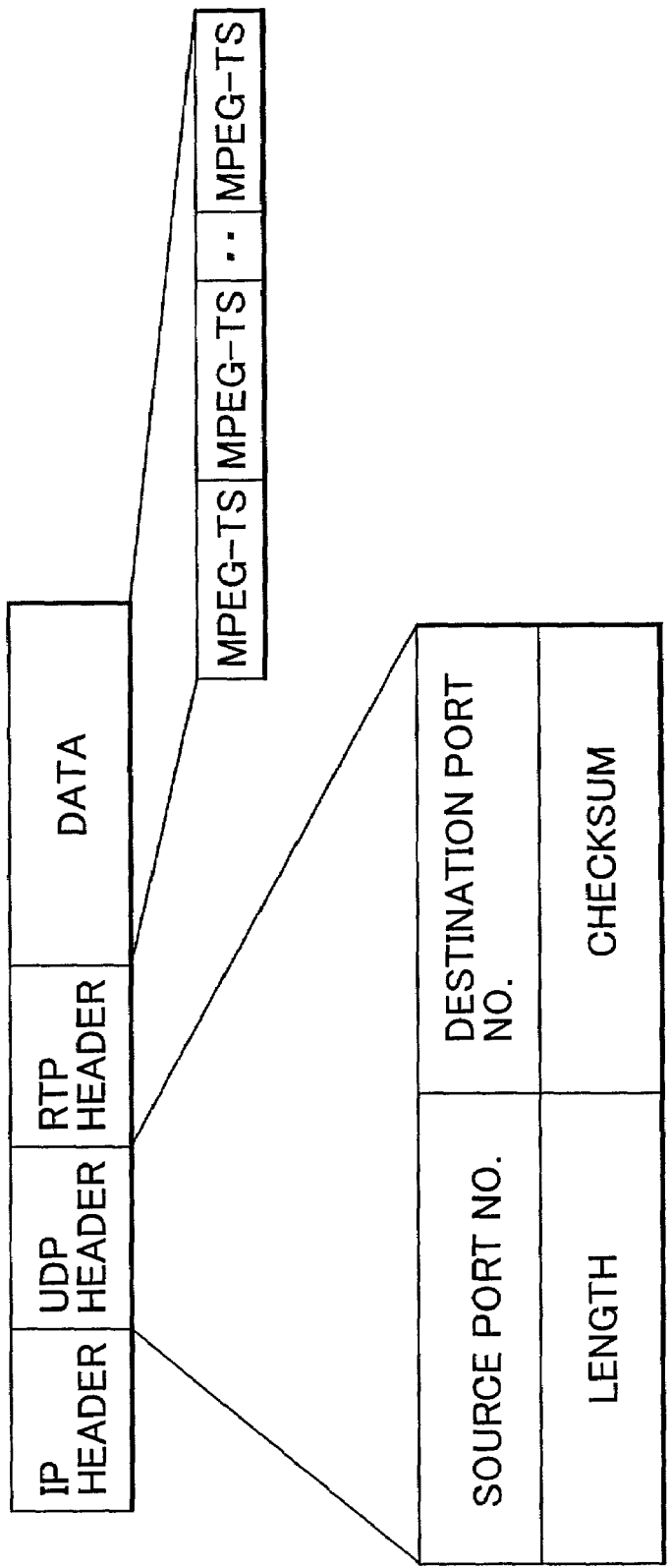
FIG. 3 is a block diagram showing the UTP header structure in the IP packet sent in the system of the present invention.

FIG. 3 shows the structure of the UDP (User Datagram Protocol) header in the IP packet packetized by RTP, UDP, IP from an MPEG transport stream. The UDP is a protocol providing a connection-less type service and has a simple header structure. The UDP header shown in the figure has a length shown by a total byte count data length and header length comprised by the source port No., destination port No., and further has a checksum serving as the reliability assurance value for the UDP packet. Control is simplified since the UDP has the simple structure shown here.

Figure 4:
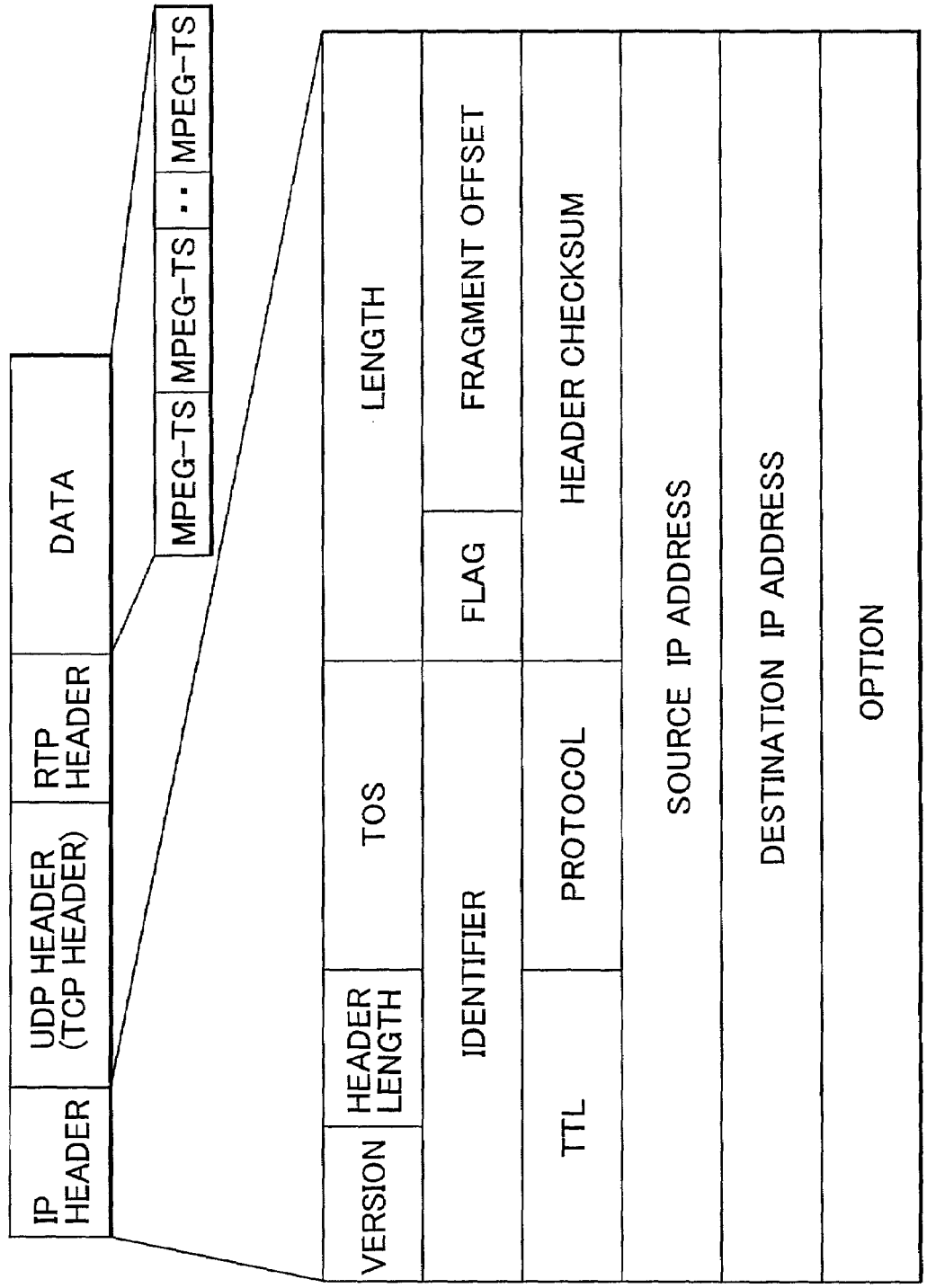
FIG. 4 is a block diagram showing the IP header structure in the IP packet sent in the system of the present invention.

The structure of the IP header in the IP packet packetized by RTP, UDP (TCP), IP from an MPEG transport stream is next shown in FIG. 4. The IP header contains: a Version indicating the version such as IPv4, IPv6, etc., header length and also a TOS (Type of Service) field holding priority information, packet length, packet identifier, a flag as control information involving data fragments in the IP layer, a fragment offset indicating the location of the fragmented data, TTL (Time to Live) indicating time information until the discarding of the data, protocol utilized in the upper layers (4: IP, 7: TCP, 17: UDP, . . . ), checksum for the header, a source IP address, and a destination IP address.

IP (Internet Protocol) is utilized as the routing protocol. IPv4 is the current utilized IP protocol and utilizes an address (IP address) for the source/destination comprised of 32 bits. In communications over the Internet, a global address consisting of a unique 32-bit IP address is assigned to each source/destination, and each individual source/destination can be determined by this IP address. However, the swift expansion of the Internet world presents a problem due to the limited address space of IPv4 or in other words, the problem of running out of global addresses. To resolve this problem, the IETF (Internet Engineering Task Force) is proposing the new IPv6 expanded from 32 bits to 128 bits, as the next generation of IP addresses. However, switching over to IPv6 will take time or in other words achieving any sudden effect from will prove difficult.

One method proposed for expanding the address spaces while using the current IPv4 is called the private address method. Unlike the global address, the private address is used within fixed organizations. For example, an optional number of private addresses can be set within a business organization, and private addresses assigned to each of the employee terminals. Using these private addresses requires conversion to a global IP address when making an external connection. The device to accomplish this conversion is called NAT (Network Address Translator).

In one method for example, one global address is received from the ISP (Internet Service Provider), and private addresses managed by the DHCP (Dynamic Host Configuration Protocol) inside the LAN. When sending a packet from inside a LAN (Local Area Network) to a WAN (Wide Area Network), this method converts the source (src) address of the IP header in the gateway or router to a global IP address having a gateway or router and is referred to as a basic NAT.

To further conserve global IP addresses, a technology is utilized to match one global IP address with a plurality of private IP addresses of different TCP ports (nodes). In this expanded NAT method called IP masquerade, a plurality of IP terminals inside the LAN can simultaneously send packets to the WAN by converting the source (src) port, as well as the source (src) address in the gateway or router, and then checking packets returning from the WAN side, and converting those source (src) ports into private IP addresses.

In the structure of FIG. 1, the gateway 101 has the combined functions of a DHCP (Dynamic Host Configuration Protocol) server to actively assign dynamic IP addresses to hosts with whom access is requested; and a DNS (Domain Name System) server for matching the domain name with the IP address. When not connected to an IP terminal, the gateway 101 assigns those private IP addresses to each terminal under its control and registers those names. The gateway 101 as the relay device of the present invention has a CSM (Client-Side Session Management) function to control sessions involving the receiving of stream data, and continuously provide service when changing terminals.

Figure 5:
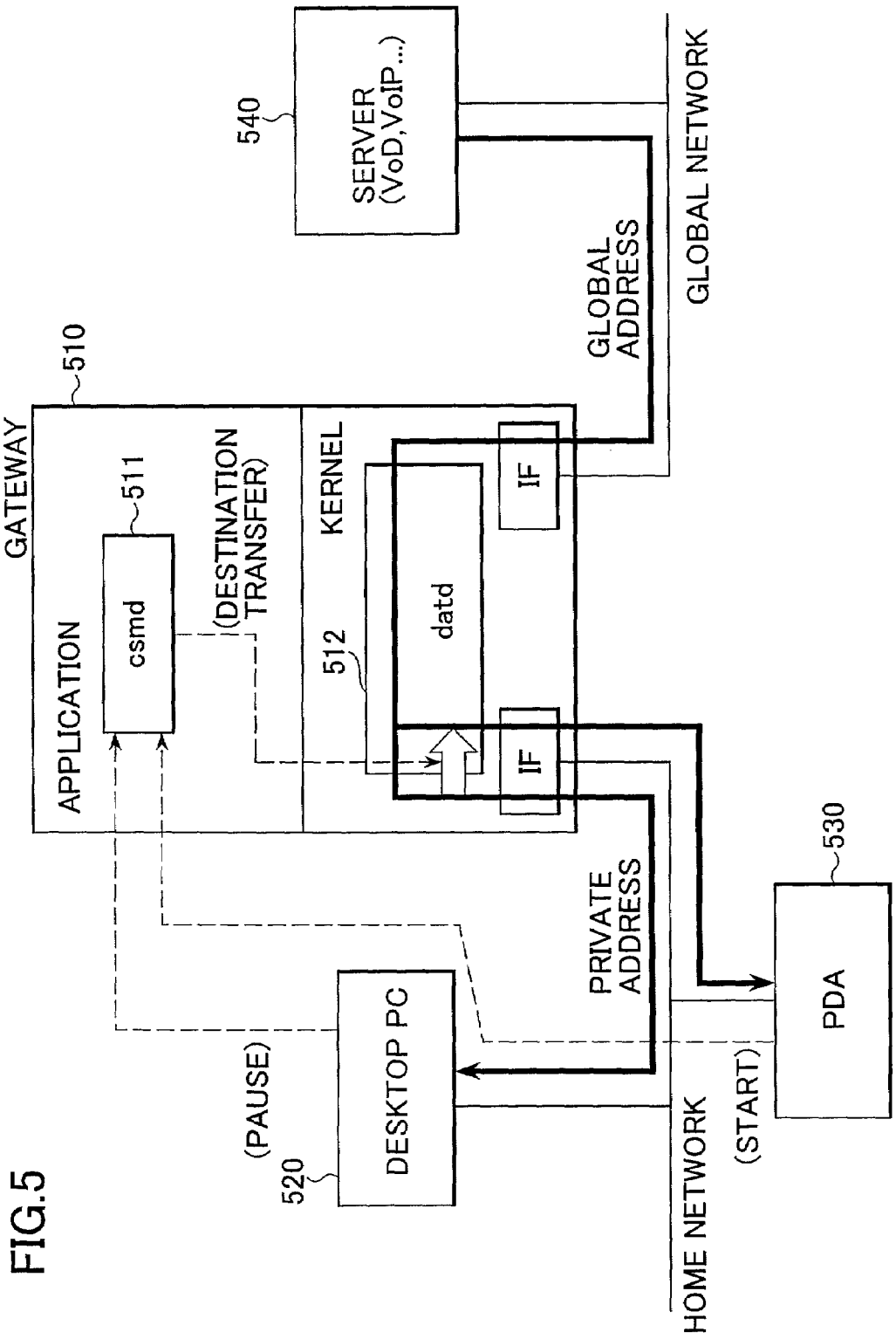
FIG. 5 is a diagram showing the data receive terminal change processing in the system of the present invention.

The CSM (Client-Side Session Management) function is next explained in detail while referring to FIG. 5.

As shown in FIG. 5, in order to run the CSM (Client-Side Session Management) function for session control, the gateway 510 serving as the relay terminal is comprised of a client-side session management daemon (csmd) 511 for handling messages transmitted from the terminal and serving as a daemon to control the session; and also a destination address transfer daemon (datd) 512 to change the packet address. These daemons permanently reside in the gateway 510 and implement session control. The daemon is a resident system program, and a program to automatically perform designated processing according to the application program or system status.

The client-side session management daemon (csmd) 511 creates a session control table, accepts messages from the terminal such as requests to switch terminals, and then rewrites (updates) the table according to the processing, and then, based on the table information, runs processing to change the destination of the packet received from the external server. The session control table is described in detail later on.

A destination address transfer daemon (datd) 512 runs processing to change the destination address of the packet relayed via the gateway. The basic structure is the same as the previously described NAT.

In FIG. 5, the desktop PC 520 serving as the client terminal, sends a pause message requesting the temporary halting of transmission in the gateway 510, of data currently being received from the gateway, and the PDA 530 shows the processing when Resume was sent as the data transmission start request.

Upon receiving a request from a terminal, the client-side session management daemon (csmd) 511 of gateway 510, checks the session control table, performs rewrite (updating) and makes a request for a change in destination to the destination address transfer daemon (datd) 512. The destination address transfer daemon (datd) 512 implements processing to change the destination of data received from the server 540, to the PDA 530 from the PC 520, according to requests from the csmd. This processing makes it possible to switch the receiving of data among different terminals and allows data to be continuously received.

The gateway 510 controls the session status so the above described destination changes can be made. The session information controlled by the gateway 510 contains the following.

session name
session ID
time session became active
IP address of server creating the session
type of media
IP address of terminal currently receiving data
IP address of terminal permitted to receive data
Session status (shown below in a–d)

a. ACTIVE: Status for sending packet to terminal.
b. PAUSE: Status for temporarily halting the sending of a packet to terminal.
c. CACHE: Status for spooling data received from server, without sending to packet.
d. OTHER: Other status The gateway 510 creates and manages a session control table based on the above information. An example of the session control table is shown in FIG. 6.

The session control table of FIG. 6 shows two session states (status). The first session which is Session ID: 00123 and Session Name: Video conference, is implemented as a Media: video under the Source address, Destination address and Permit address settings shown in the table, and the current session status is Pause or in other words, shows a status where temporarily stopped. The second session which is Session ID: 01543 and Session Name: IP phone, is implemented in the Media: Audio under the Source address, Destination address and Permit address settings shown in the table, and the current session status is Active, in other words, a status in which the packet is being sent.

Processing requests are sent to the gateway from any of the terminals shown in the configuration of FIG. 1 such as the desktop PC 102, the notebook PC 103, the PDA 104 under the control of the gateway. Requests from the terminals are the following.

PAUSE: Temporary Stop

Pause is a message requesting the temporary stop of transmission in the gateway of data being received on the current gateway. The following information is delivered as arguments.

IP address of terminal currently receiving data
  IP address of terminal permitted to receive data
  Whether or not to cache data received data on the gateway in the period receiving of data is halted (pause).
  Whether or not to copy without switching the receiving of data, when another terminal is continuously receiving data.

LIST: List Acquisition

List is a message requesting acquisition of a session list relating to the packet currently being relayed on the gateway.

RESUME: Start or Restart

Resume is a message requesting the start of a session in progress on a terminal or the restarting of a session that was temporarily halted (paused). The following are delivered as message arguments.

Session ID

Whether or not to copy the receive data on the gateway

CALL: Inform Another Terminal About Session

Call is a message informing another terminal with information about a session in progress or information on a session temporarily stopped (paused). If sent after a pause, then receive can be switched to the other terminal, and for a session in progress, another terminal can be induced to receive the same session in parallel. The following messages are delivered as arguments.

IP address of terminal currently receiving data

IP address of terminal permitted to receive data

Each terminal that receives data in the relay processing from the gateway can send any of the following requests to the gateway. A data string format for requests is shown below.

METHOD=[PAUSE, LIST, RESUME, CALL]
To=[IP-Address]
From=[IP-Address]
S-ID=[integer]
Recv=[IP-Address]
Permit=[Network-address, IP-Address]
Cache=[On,Off]
Copy=[On,Off]

Message data string when the request is a pause is shown below.

Figure 7:
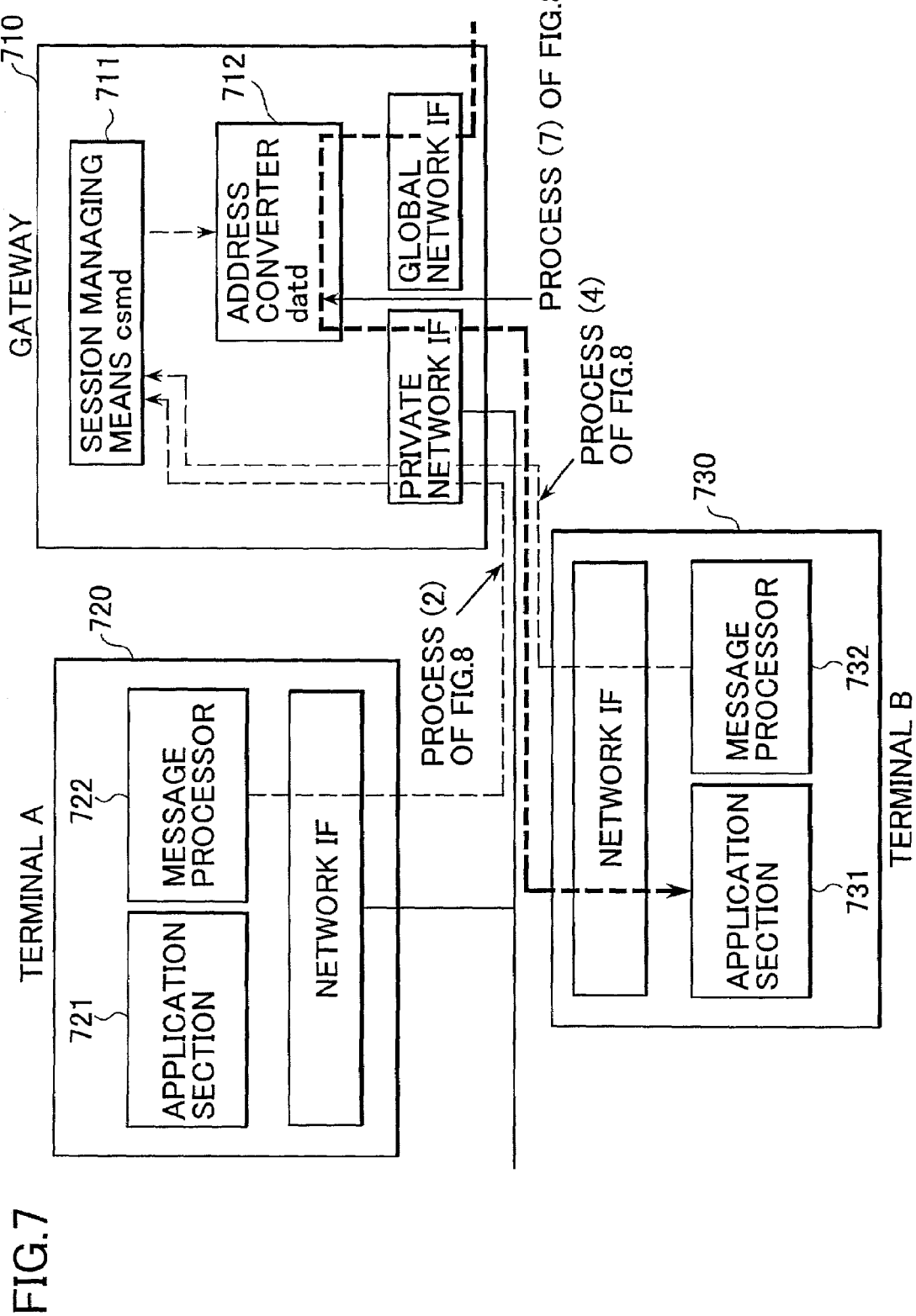
FIG. 7 is a diagram showing the data receive terminal change processing in the system of the present invention.

METHOD=PAUSE
To=43.11.135.29
From=43.11.135.1
S-ID=12345
Recv=43.11.135.1
Permit=43.11.135.0/24
Cache=ON
Copy=Off The gateway receives requests such as Pause, List, Resume, Call as listed above from terminals under its control, and runs processing according to the request. An example of the message processing is shown in FIG. 7.

The gateway as described above has portable terminals such as a PC or PDA as control terminals. In the structure in FIG. 7, the gateway 710 has a terminal A720 and a terminal B730 as control terminals, and relays data through these terminals.

The terminals 720, 730 are comprised of application sections 721, 731 for decoding, expansion, and reproducing data; and message processors 722, 732 for sending and receiving messages to and from the gateway 710; and have a network interface for sending/receiving data by way of the gateway 710.

The gateway 710 has a private network interface for sending and receiving data to and from each terminal, and a global network interface functioning as an interface with external networks. The gateway 710 further has a client-side session management daemon (csmd) 711 as a session control means for processing messages from the terminal, and a destination address transfer daemon (datd) 712 as an address conversion means.

The processing for switching the receive terminal to terminal B730, when receiving stream data such as moving picture data or voice data via the gateway 710, and the user is terminal A, 720 is described next using FIG. 7 and FIG. 8.

Figure 8:
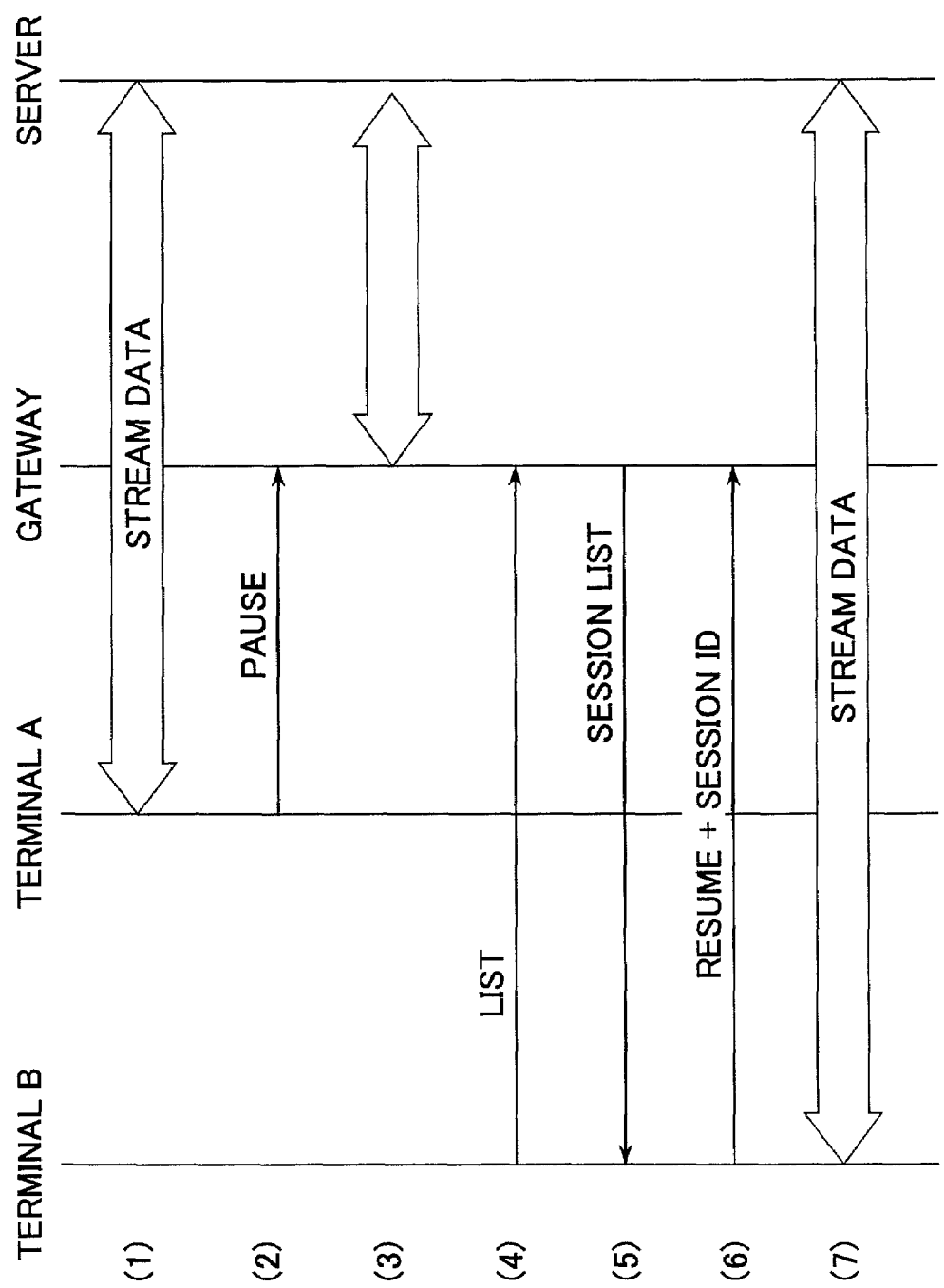
FIG. 8 is a chart showing a data receive terminal change process sequence (example 1) in the system of the present invention.

When stream data is received (Process (1) of FIG. 8) via the gateway 710, and switching the data receive terminals, a pause (PAUSE) message is generated in the message processor 722 of terminal A, 720 and sent (Process (2) of FIG. 8) to the gateway 710 by way of the network interface. As described previously, this pause request contains: the IP address of the terminal currently receiving data, the IP address of terminal permitted to receive data, whether or not to cache data received on the gateway in the period receiving of data is halted (pause), whether or not to copy without switching the receiving of data, when another terminal is continuously receiving data.

When a pause request is received from the terminal A, 720, the session control means (csmd) 711 of gateway 710 pauses (Process (3) of FIG. 8) the sending of data currently being transferred via the gateway 710. Though not shown in FIG. 7, the gateway 710 has a cache for temporary storage and a storage means.

The user B next generates a list (LIST) message in the message processor 732 of terminal B, 730 and sends it via the network interface to the gateway 710 (Process (4) of FIG. 8). This list request, as mentioned previously, is a request to acquire a session list involving the packet currently being relayed on the gateway 710.

When a list request is received from the terminal B730, the session control means (csmd) 711 of gateway 710 sends (Process (5) of FIG. 8) a session list showing the data transfer process status by way of the current gateway.

The session list shows the data packet processing status of the current gateway. The status may be displayed in various forms. An example of one display is shown in FIG. 9.

Figure 9:
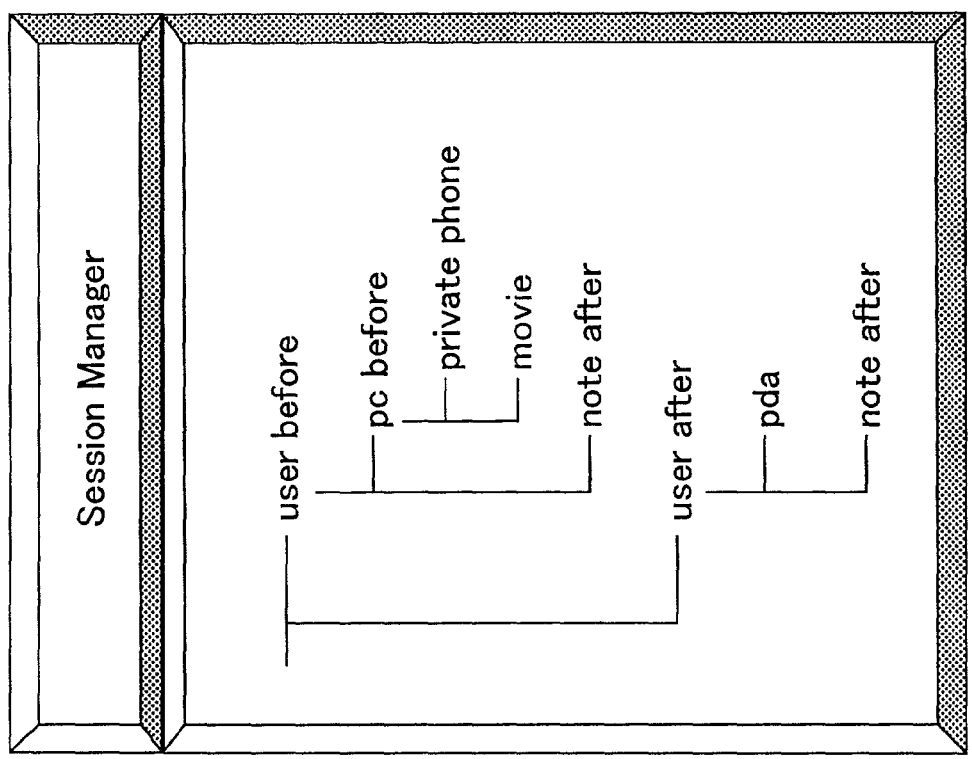
FIG. 9 is a drawing of the control terminal displaying a session list output from the data relay device of the system of the present invention.

The example in FIG. 9 shows a layer tree for a session being run by the user, user's device and device. The "before" in FIG. 9, indicates the user and user device of the session being processed, in other words with data currently being transferred or the transfer process paused.

The PC (pc before) in the example in FIG. 9, indicates whether the private phone session and movie session is active or is a pause. The "after" shown in FIG. 9 is a user and user device for whom data processing is not currently being performed.

The user specifies a session to switch to and a device to switch to, and the session can then also be switched by user selection. In the example shown in FIG. 9 for instance, a movie is selected as the session to be switched to, and if [note] indicating a notebook PC is selected as the device to be switched to, then the data currently being sent to the PC is sent to the notebook PC.

In the process for sending the data shown in FIG. 9 selected by the user to the gateway 710, the resume request and selected session ID are sent (Process (6) of FIG. 8) to the gateway.

When the Resume request and selected session ID are received, the session control means (csmd) 711 of gateway 710 rewrites the session control table (see FIG. 6) and outputs a destination change process command for the packet received from the external server to the destination address transfer daemon (datd) 712 as an address converter. The data address transfer daemon (datd) 712 executes processing to change the destination address of the rewritten session, from terminal A, 720 to terminal B, 730. As a result, the stream data that terminal A, 720 had received via the gateway 710 is received (Process (7) of FIG. 8) continuously by the terminal B, 730.

Figure 10:
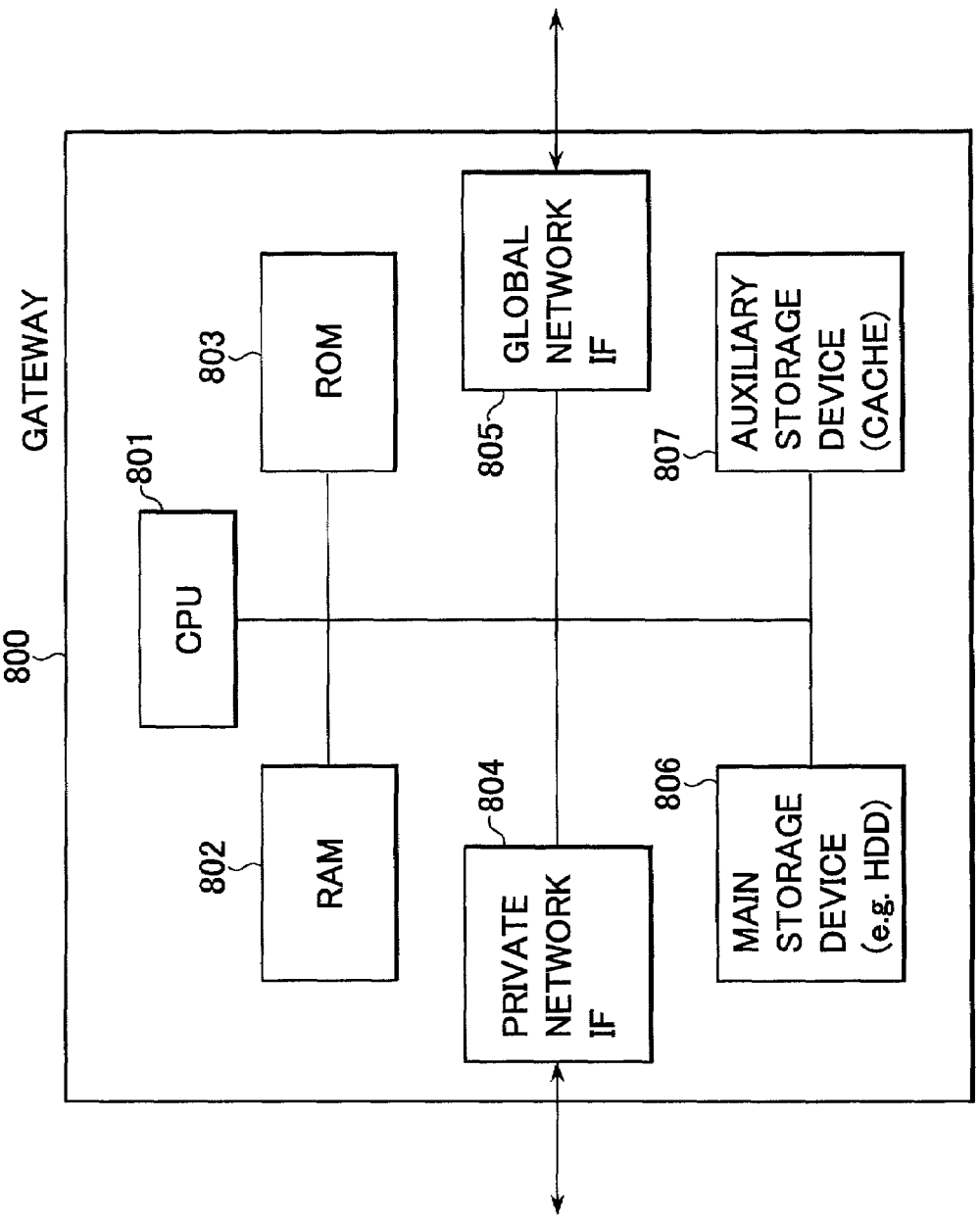
FIG. 10 is a block diagram showing the structure of the data relay device in the system of the present invention.

The structure of the gateway is described while referring to FIG. 10. The gateway 800 as shown in FIG. 10, is comprised of a private network interface 804 for exchanging (sending/receiving) data with each terminal; and a global network interface 805 functioning as an interface with external networks.

The gateway 800 is further comprised of a CPU 801 to implement the previously described message processing function of the client-side session management daemon (csmd) the address transfer function of the destination address transfer daemon (datd), and the DHCP (Dynamic Host Configuration Protocol) function. The gateway 800 is also comprised of a RAM 802, and ROM 803 to store the respective processing programs and as work areas when running these programs. The gateway 800 further has a main storage device 806 to store the previously described session control tables, and an auxiliary storage device 807 as the data cache.

The gateway 800 receives the previously described Pause, List, Resume and Call requests from the control terminals by way of the private network interface 804, and runs the processing (message processing) on the CPU 801 according to the request.

Figure 11:
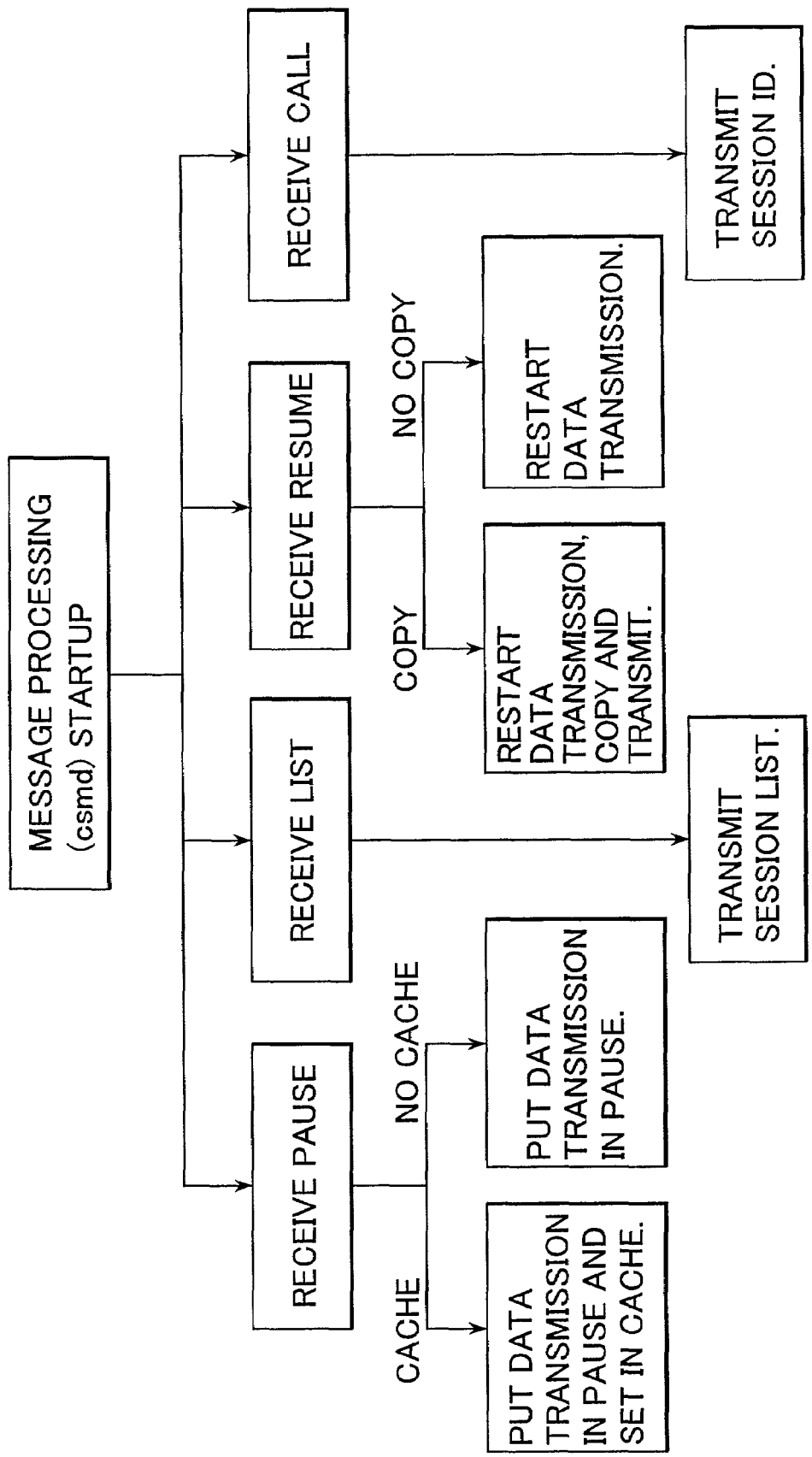
FIG. 11 is a block diagram showing the request received by the data relay device and the processing status in the system of the present invention.

The types of message processing executed on the gateway are described next while referring to FIG. 11. The requests received from the terminals under control of the gateway are four types consisting of the previously described Pause, List, Resume and Call.

The pause request is of two types, one consisting of a request for cache processing of the data on the gateway, and a type not requesting cache processing. When a request for cache processing is received, the gateway temporarily halts (pauses) the transmit of data on the terminal currently sending (relaying) data, and starts cache processing of the data on the gateway. When the request does not include cache processing, the gateway temporarily stops (pauses) transmit of the data currently being sent (relayed).

When the gateway has received a list request, a session list (see FIG. 9) is sent to the terminal making the request.

A resume request received by the gateway is of two types; when one type contains a copy request within the resume request (copy), the data is copied on the gateway and processing implemented to then send it to the terminal making the request. When a copy request is not included within the resume request (no copy), the data is not copied on the gateway, and processing is implemented to send the data to the terminal making the request.

The call request is a message to convey information on a session already in progress or a session temporarily halted (paused) to another terminal. The session ID (for example, the session list shown in FIG. 9) for the terminal currently receiving data is sent from the terminal that transmitted the call request, to the call destination which is the terminal allowed to receive the specified data.

Requests received by the gateway from terminals under its control are the previously described four types; pause, list, resume and call. Combinations of these four requests make various types of processing possible. Examples of typical uses are shown in FIG. 12 and FIG. 13.

The processing in FIG. 12 is first described while referring to the structure of FIG. 7. In the processing in FIG. 12, is processing to switch the session from the terminal A, 720 to terminal B, 730. Requests made to the gateway 710 use pause, call, and resume.

When the user switches the data receive terminal while currently receiving (Process 1 of FIG. 12) stream data on the terminal A, 720 via the gateway 710, the message processor 722 of terminal A, 720 generates a pause (PAUSE) message sent (Process (2) of FIG. 12) to the gateway 710, by way of the network interface. As previously related, the pause request contains: the IP address of the terminal currently receiving data, the IP address of terminal permitted to receive data, whether or not to cache the data received on the gateway in the period receiving of data is halted (pause), whether or not to copy without switching the receiving of data, when another terminal is continuously receiving data.

When the gateway 710 receives the pause request from the terminal A, 720, the session control means (csmd) 711 of gateway 710, temporarily (pauses) halts (Process (3) of FIG. 12) the data currently being transferred on the gateway 710.

Next, the user generates a call (CALL) message in the message processor 722 of terminal A, 720 and sends (Process (4) of FIG. 12) it to the gateway 710 by way of the network interface. This call request, as described previously is a message to convey information on a session already in progress or a session temporarily halted (paused) to another terminal. The session ID (for example, the session list shown in FIG. 9) for the terminal currently receiving data is sent (Process (5) of FIG. 12) from the terminal that transmitted the call request, to the call destination which is the terminal allowed to receive the specified data, or in this case terminal B, 730.

The terminal B, 730 sends the data for example displayed in FIG. 9, or in other words, sends the selected session, to the gateway 710. This processing is implemented as processing to send (Process (6) of FIG. 12) the resume request and selected session ID to the gateway.

When the gateway 710 receives the resume request and selected session ID, the client-side session management daemon (csmd) 711 updates (rewrites) the session control table (see FIG. 6), and for the updated (rewritten) session, outputs a destination transfer command for the packet received from the external server to the data address transfer daemon (datd) 712 for address conversion. The data address transfer daemon (datd) 712 changes the destination address of the rewritten (updated) session, from terminal A, 720 to terminal B, 730. As a result, the stream data that terminal A, 720 had received via the gateway 710 is received (Process (7) of FIG. 12) continuously by the terminal B, 730.

The processing of FIG. 13 is described next while referring to the structure of FIG. 7. In the process of FIG. 13, the data being received by terminal A, 720 is copied to the terminal B, 730 and sent. Call and resume are used as the requests to the gateway 710.

When the user is receiving (Process (1) of FIG. 13) stream data in the terminal A, 720 via the gateway 710, and copy-transmitting the data to another terminal, (here the terminal B, 730) a call (CALL) message is generated in the message processor section 722 of terminal A, 720 and sent via the network interface (Process (2) of FIG. 13) to the gateway 710. This call request, as described previously, is a message to convey information on a session already in progress or a session temporarily halted (paused) to another terminal. The session ID (for example, the session list shown in FIG. 9) for the terminal currently receiving data is sent (Process (3) of FIG. 13) from the terminal that transmitted the call request, to the call destination which is the terminal allowed to receive the specified data, or in this case terminal B, 730. The pause request is not received from the terminal A, 720 so data is continuously transmitted from the gateway 710 to the terminal A, 720.

The terminal B, 730 sends the data for example displayed in FIG. 9, or in other words, sends the selected session, to the gateway 710. This processing is implemented as processing to send (Process (4) of FIG. 13) the resume request and selected session ID to the gateway.

When the gateway 710 receives the resume request and selected session ID, the client-side session management daemon (csmd) 711 updates (rewrites) the session control table (see FIG. 6), and for the updated (rewritten) session, outputs a destination transfer command for the packet received from the external server to the data address transfer daemon (datd) 712 for address conversion.

In this case, the update (rewrite) by the client-side session management daemon (csmd) 711, continues with the data control session still active for the terminal A, 720, and further, a data transmit session is added for the terminal B, 730 as the destination for the same data.

Along with keeping the terminal A, 720 as the destination address for the session, the data address transfer daemon (datd) 712 adds the terminal B, 730 as a destination address. As a result, the stream data that terminal A, 720 had received via the gateway 710 is also continuously received (Process (5) of FIG. 13) in parallel by the terminal B, 730.

Various types of processing other than the above described examples are also possible. Typical processing achieve by request combinations are shown collectively below. In the following description, the pause (user A, terminal A) for example, indicates processing to output a pause request from terminal A by user A via the gateway.

1 Processing for the user A to temporarily stop (pause) receiving data on terminal A, and reopen the receiving of data on terminal B.

Pause (user A, terminal A)+Resume (user A, terminal B)

In the above processing, the pause (user A, terminal A) may contain a request for cache storage (or not) on the gateway. The gateway may in some cases perform cache processing or not perform cache processing according to the request.

(2) Processing for the user B to acquire a session list on terminal B, and restart the receiving of data on terminal B.

List (user B, terminal B)+Resume (user B, terminal B)

In the above processing, the resume (user B, terminal B) may contain a copy request for copy on the gateway. The gateway may implement copy or not implement it, according to the request.

(3) Processing for the user A to temporarily halt (pause) receiving of data on the terminal A, and the user B to restart the receiving of data on the terminal B.

Pause (user A, terminal A)+List (user B, terminal B)+Resume (user B, terminal B)

In the above processing, the pause (user A, terminal A) may contain a request for cache storage (or not) on the gateway. The gateway may in some cases perform cache processing or not perform cache processing according to the request. Also, the resume (user B, terminal B) may contain a copy request for copy on the gateway. The gateway may implement copy or not implement it, according to the request.

(4) Processing for the user A to temporarily halt (pause) receiving of data on the terminal A, call up user B, and restart the receiving of data on terminal B by the user B.

Pause (user A, terminal A)+Call (user A, terminal A)+Resume (user B, terminal B)

In the above processing, the pause (user A, terminal A) may contain a request for cache storage (or not) on the gateway. The gateway may in some cases perform cache processing or not perform cache processing according to that request. Also, the resume (user B, terminal B) may contain a copy request for copy on the gateway. The gateway may implement copy or not implement copy, according to that request.

(5) Processing for the user A to temporarily halt (pause) receiving of data on the terminal A, call up user B, and after user B checks the session list, the user B restarts the receiving of data on terminal B.

Pause (user A, terminal A)+Call (user A, terminal A)+List (user B, terminal B)+Resume (user B, terminal B)

In the above processing, the pause (user A, terminal A) may contain a request for cache storage (or not) on the gateway. The gateway may in some cases perform cache processing or not perform cache processing according to that request. Also, the resume (user B, terminal B) may contain a copy request for copy on the gateway. The gateway may implement copy or not implement copy, according to that request.

In the structure of the present invention as described above, a variety of processing types can be achieved by combinations of request messages. In the processing for switching sessions, the session for example of user A on terminal A, might: possibly be switched by another user constituted by user B to receive data, or receiving and copy of data might be performed without obtaining the consent of the user A, so preferably a function is provided for registering the user on the gateway so that processing can only be implemented by pre-registered users or a function is provided to perform session switching first, and then verify (authenticate) the user making the request, to prevent the unauthorized acquisition of data.

The present invention was described while referring to a designated embodiment. However, as is apparent to one skilled in the related art, corrections or substitutions to the embodiments or working example can be made without departing from the substance or scope of the present invention. In other words, examples were utilized to describe the present invention and these examples should not be interpreted as limiting the invention. The section containing the scope of the claims should be referred to in order to determine the substance of the present invention.

What is claimed is:

1. A communications relay device operatively connected between an external network and a local network in which a plurality of control terminals are connected, the communications relay device comprising:

session control means for controlling a first session status of a first data communication session on a first of the plurality of control terminals in which data associated with the first session is received from the external network, and for controlling access to the first session in accordance with a processing request received from one of the control terminals, the session control means has a session control table that includes each session status for each data communication session on each of the control terminals in which data associated with the respective session is received from the external network via the communications relay device, each session status in the session control table including at least one permit address, each permit address corresponding to a respective one of the control terminals permitted to receive data associated with the respective session; and address conversion means for converting a destination address of data associated with the first session and received from the external network via the communications relay device, wherein:

when the processing request is a resume request, said session control means rewrites the first session status in the session control table in accordance with the resume request from said one control terminal when the one control terminal providing the processing request corresponds to the at least one permit address of the first session status, and outputs an address rewrite processing request to said address conversion means, and said address conversion means rewrites the destination address of the data associated with the first session based on the address rewrite processing request from said session control means.

2. A communications relay device according to claim 1, wherein the processing request is a pause request from said first control terminal and said session control means temporarily stops the relay of data associated with the first data communication session on said first control terminal based on the pause request from said first control terminal.

3. A communications relay device according to claim 1, wherein the resume request includes a session identifier and said session control means outputs the address rewrite processing request in accordance with the session identifier so that said address communication means rewrites the destination address of the data associated with the first data communication session designated by the session identifier.

4. A communications relay device according to claim 1, wherein when the processing request is a list request, said session control means outputs a list to said one control terminal, the list identifying each data communication session having a session status controlled by the session control means and that the one control terminal is able to selectively access in accordance with the at least one permit address associated with each session status in the control session table.

5. A communications relay device according to claim 1, wherein when the processing request is a call request from the first control terminal, said session control means outputs a list to a destination terminal contained in the call request, the list identifying each session on the first control terminal that the one control terminal is able to selectively access in accordance with the at least one permit address associated with each session status in the control session table.

6. A communications relay device according to claim 1, wherein copy processing or cache processing of relay data in said communications relay device is executed in response to the processing request being a pause request from said first control terminal.

7. A communications relay device according to claim 1, wherein the first session status includes a session identifier corresponding to the first session on said first control terminal, wherein said session control means controls the first session status based on said session control table, and rewrites the first session status when the processing request is one of a pause request and a resume request.

8. A communications relay device according to claim 7, wherein the first session status in said session control table includes a destination address and a source address corresponding to said session identifier.

9. A communications relay method in a communications relay device for implementing relay processing between an external network and a local network in which a plurality of control terminals are connected to the local network, said method comprising:

controlling a first session status of a first data communication session on a first of the plurality of control terminals in which data associated with the first session is received from the external network via the communications relay device;

controlling access to the first session in accordance with a processing request received from one of the control terminals and a session control table, the session control table including each session status for each data communication session on each of the control terminals in which data associated with the respective session is received from the external network via the communications relay device, each session status in the session control table including at least one permit address, each permit address corresponding to a respective one of the control terminals permitted to receive data associated with the respective session; and converting a destination address of data associated with the first session and received from the external network via the communications relay device, wherein: the step of controlling the first session status comprises, when the processing request is a resume request, rewriting the first session status in the session control table in accordance with the processing request from said one control terminal when the one control terminal providing the processing request corresponds to the at least one permit address of the first session status, and generating an address rewrite processing request, and the step of converting a destination address comprises rewriting the destination address of the data associated with said the first session based on the address rewrite processing request.

10. A communications relay method according to claim 9, wherein the processing request is a pause request from said first control terminal and the step of controlling the session status comprises temporarily stopping the relay of data associated with the first data communication session on said first control terminal based on the pause request from said first control terminal.

11. A communications relay method according to claim 9, wherein the resume request includes a session identifier and the step of controlling the session status comprises outputting the address rewrite processing request in accordance with the session identifier so that said address conversion means rewrites the destination address of the data associated with the first data communication session designated by the session identifier.

12. A communications relay method according to claim 9, wherein, when the processing request is a list request, the step of controlling the session status comprises, outputting a list to the one control terminal, the list identifying each data communication session having a session status controlled by the session control means and that the one control terminal is able to selectively access in accordance with the at least one permit address associated with each session status in the control session table.

13. A communications relay method according to claim 9, wherein when the processing request is a call request from the first control terminal, the step of controlling the session status comprises outputting a list to a destination terminal contained in the call request the list identifying each session on the first control terminal that the one control terminal is able to selectively access in accordance with the at least one permit address associated with each session status in the control session table.

14. A communications relay method according to claim 9, further comprises a step to execute copy processing or cache processing of relay data in said communications relay device in response to the processing request being a pause request from said first control terminal.

15. A communications terminal device for receiving data by way of a communications relay device, said communications relay device being operatively connected between an external network and a local network in which a plurality of control terminals are connected, the communications relay device including:

session control means for controlling a first session status of a first data communication session on a first of the plurality of control terminals in which data associated with the first session is received from the external network and for controlling access to the first session in accordance with a processing request received from one of the control terminals, the session control means has a session control table that includes each session status for each data communication session on each of the control terminals in which data associated with the respective session is received from the external network via the communications relay device, each session status in the session control table including at least one permit address, each permit address corresponding to a respective one of the control terminals permitted to receive data associated with the respective session; and address conversion means for converting a destination address of data associated with the first session and received from the external network via the communications relay device, wherein:

when the processing request is a resume request, said session control means rewrites the first session status in the session control table in accordance with the resume request from said one control terminal when the one control terminal providing the processing request corresponds to the at least one permit address of the first session status, and outputs an address rewrite processing request to said address conversion means, and said address conversion means rewrites the destination address of the data associated with the first session based on the address rewrite processing request from said session control means, and wherein said communications terminal device is the one control terminal operatively configured to output to said communications relay device the resume request as the processing request.

16. A communications terminal device according claim 15, wherein said communications terminal device is operatively configured to output a pause request to said communications relay device to temporarily stop the on-going relay of data associated with the first data communication session on said first control terminal.

17. A communications terminal device according claim 15, wherein said communications terminal device is operatively configured to output to said communications relay device a list request for a list identifying each data communication session having a session status controlled by the session control means and that the communications terminal is able to selectively access in accordance with the at least one permit address associated with each session status in the control session table.

18. A communications terminal device according claim 15, wherein said communications terminal device is operatively configured to output to said communications relay device a call request to prompt said communications relay device to inform a destination terminal of the plurality of control terminals of the first session processed in said communications relay device so that the destination terminal is able to selectively access the session in accordance with the at least one permit address associated with each session status in the control session table.

19. A communications terminal device according claim 15, wherein said communications terminal device is operatively configured to output to said communications relay device a copy processing request or a cache processing request for relay data in said communications relay device.

20. A program storage medium for providing a computer program for executing relay processing between an external network and a local network on a computer system, the computer system comprising a plurality of control terminals connected to the local network, wherein said computer program comprises:

controlling a first session status of a first data communication session on a first of the plurality of control terminals in which data associated with the first session is received from the external network via the communications relay device;

receiving a processing request from one of the control terminals; controlling access to the first session in accordance with the processing request and a session control table, the session control table including each session status for each data communication session on each of the control terminals in which data associated with the respective session is received from the external network via the communications relay device, each session status in the session control table including at least one permit address, each permit address corresponding to a respective one of the control terminals permitted to receive data associated with the respective session; and converting a destination address of data associated with the first session and received from the external network via the communications relay device, wherein:

the step of controlling the first session status comprises rewriting the first session status in the session control table in accordance with the processing request from said one control terminal when the one control terminal providing the processing request corresponds to the at least one permit address of the first session status, and generating an address rewrite processing request, and the step of converting a destination address comprises rewriting the destination address of the data associated with the first session based on the address rewrite processing request.

21. A communications relay device operatively connected between an external network and a local network in which a plurality of control terminals are connected, the communications relay device comprising: memory storing a session control table that includes each session status for each data communication session on each of the control terminals in which data associated with the respective session is received from the external network via the communications relay device, each session status in the session control table including at least one permit address, each permit address corresponding to a respective one of the control terminals permitted to receive data associated with the respective session;

a controller operatively configured to control a first session status of a first data communication session on a first of the plurality of control terminals in which data associated with the first session is received from the external network, and to control access to the first session in accordance with a processing request received from one of the control terminals and the session control table; and address conversion means for converting a destination address of data associated with the first session and received from the external network via the communications relay device, wherein:

when the processing request is a resume request, said controller rewrites the first session status in the session control table in accordance with the resume request from said one control terminal when the one control terminal providing the processing request corresponds to the at least one permit address of the first session status, and outputs an address rewrite processing request to said address conversion means, and said address conversion means rewrites the destination address of the data associated with the first session based on the address rewrite processing request from said session control means.

* * * * *